United States Patent [19]
Gauthier et al.

[11] 3,734,313
[45] May 22, 1973

[54] BULK BIN LEVEL INDICATOR

[75] Inventors: Donald E. Gauthier, Spring Lake; William V. Jones, Muskegon, both of Mich.

[73] Assignee: Donald Engineering Company, Inc., Grand Rapids, Mich.

[22] Filed: June 10, 1971

[21] Appl. No.: 151,777

[52] U.S. Cl..............214/17 CA, 73/37.5, 73/290 R, 200/61.21
[51] Int. Cl. ....B65g 65/32, G01f 23/14, H01h 35/34
[58] Field of Search .......................214/17 CA, 18.2; 73/37.5, 37.6, 290 R; 200/61.2, 61.21

[56] References Cited

UNITED STATES PATENTS 3,213,670 10/1965 MacGeorge.....................214/18.2 X
2,696,606 12/1954 De La Pomelie............214/17 CA X

*Primary Examiner*—Robert G. Sheridan
*Attorney*—Price, Heneveld, Huizenga & Cooper

[57] ABSTRACT

The present invention provides a level indicator for indicating the level of bulk materials such as molding sand which are stored in a bin. The indicator employs a pneumatically operated sensor having a J-shaped output tube which is mounted in the bin to supply a stream of air to an input tube across a gap between the J-shaped output tube and the input tube when no bulk material is present at the level of the indicator. When the bulk material is present at the level of the indicator, it obstructs the gap between the output and input tubes. This causes a pressure change at the input tube which can be detected by suitable means coupled to the input tube to provide a control signal. The control signal can be utilized in conjunction with filling apparatus to automatically refill the bin when the level falls below a predetermined level at which an indicator is installed. A second level indicator can be installed near the top of the bin to provide a control signal which will automatically stop associated filling apparatus when the bulk material has reached the level of the second indicator and the bin is filled.

17 Claims, 6 Drawing Figures

INVENTORS
DONALD E. GAUTHIER
WILLIAM V. JONES
BY Price, Heneveld
Huizenga & Cooper
ATTORNEYS INVENTORS
DONALD E. GAUTHIER
WILLIAM V. JONES
BY Price, Heneveld
Huizenga & Cooper
ATTORNEYS

BULK BIN LEVEL INDICATOR

BACKGROUND OF THE INVENTION

The present invention relates to a bulk bin level indicator and specifically to a pneumatically operated indicator having an output tube for providing a stream of air to an input tube across a gap between the output and input tubes.

When storing bulk materials such as molding sand used in a foundry it is desirable to provide a level indicating means which automatically detects the level of the bulk material and which has the capability of providing a control signal such that the bin can be automatically refilled as the bulk material is used from the bin and the remaining material reaches a low level. Several methods have been employed for providing such an indicator by using a back-pressure type of pneumatic device such as described in U.S. Pat. Nos. 2,640,977 or 2,846,879. The devices described in these patents have proven generally unsatisfactory to provide the desired level detection function when used with foundry molding sand which has a high degree of porosity and which will therefore not provide the necessary back-pressure required when using such a detection device. The level indicator of the present invention, however, employs an air gap type of device in which the bulk material obstructs the stream of air between an output tube and an input tube. The pressure at the input tube will vary, therefore, as the bulk material reaches the level at which the gap is located in the bin. This pressure change can be employed to provide a suitable control signal for automatically operating refilling mechanism for the bulk bin.

It is an object, therefore, of the present invention to provide a bulk bin level indicator having an air gap detection device which can be mounted within the bin to detect the level of the bulk material stored in the bin when the material obstructs the air gap between an output tube and an input tube of the device.

It is a further object of the present invention to provide a pneumatically operated bulk bin indicator which can be used successfully with porous materials such as foundry molding sand.

Another object of the present invention is to provide a bulk bin level indicator and control means for automatically filling the bulk bin when the level of the bulk material reaches a predetermined level.

It is an additional object of the present invention to provide an automatic filling means for a bulk bin which controls the bulk material supply to provide bulk material when the bin level has reached a predetermined lower level and to cut off the supply of bulk material when the bulk bin level has reached a predetermined upper level.

SUMMARY OF THE INVENTION

Apparatus embodying the present invention includes a source of pressurized gas, a first tube coupled to the source of pressurized gas for providing a stream of gas to a second tube aligned with the first tube but spaced at a predetermined distance from the first tube such that an air gap exists between the first and second tubes. The two tubes are rigidly mounted in relation to each other and mounted interior to a bulk bin such that as bulk material in the bin reaches the gap between the two tubes, the air stream will be obstructed and differential pressure in the second tube can be detected by pressure actuated means. This means can provide a signal which indicates the existence of bulk material at the level of the indicator and can further be employed to control the supply of bulk material for filling the bin.

DETAILED DESCRIPTION OF THE PREFERRED EMBODIMENT

Figure 1:
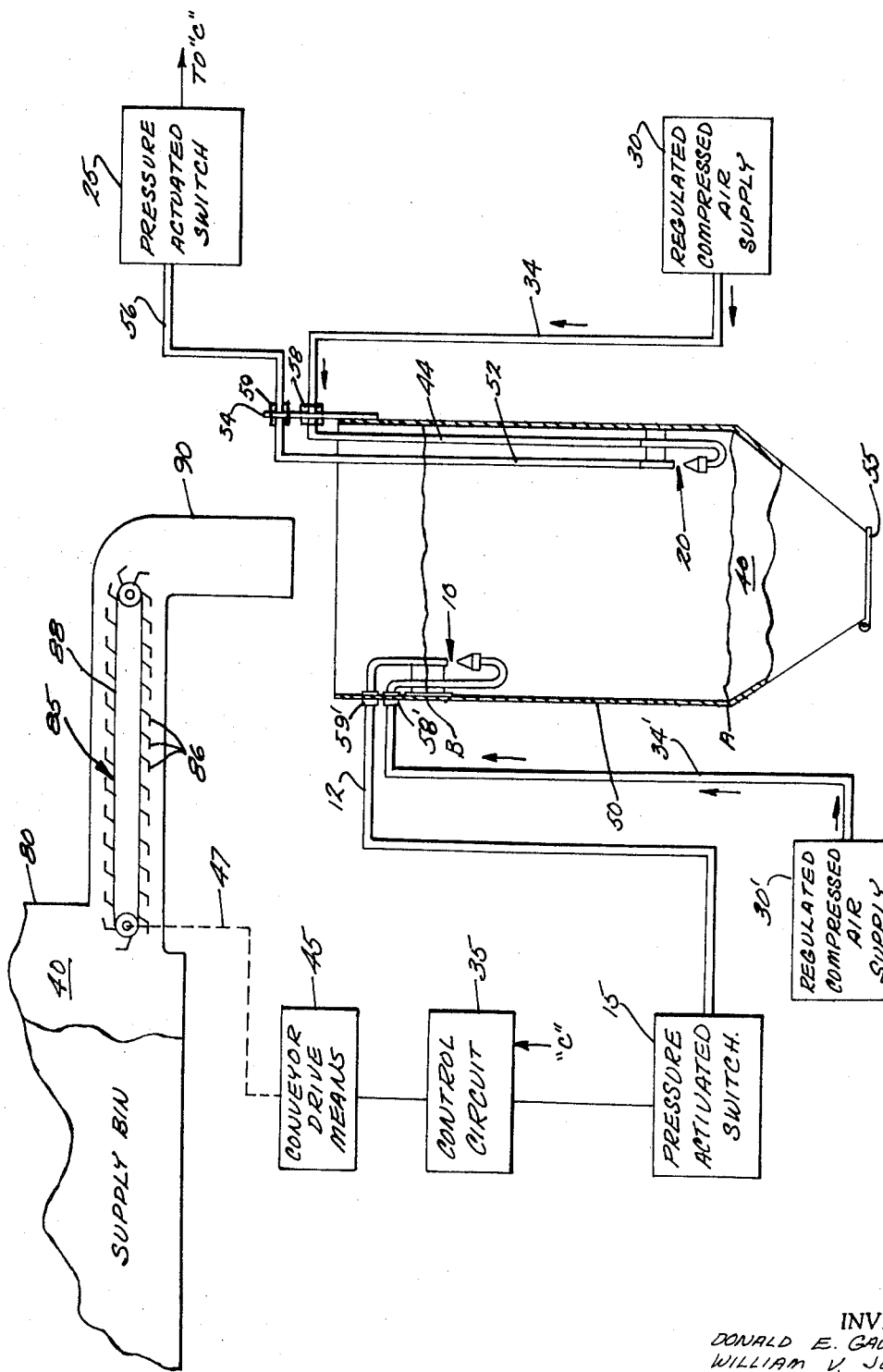
FIG. 1 is a pictorial diagram partially in schematic and block diagram form showing a bulk bin employing two level indicators embodying the present invention and a control system which operates in conjunction with a supply bin to automatically refill the bin as the bulk material is depleted therefrom.

In FIG. 1 there is shown a partially cutaway view of a bulk bin or hopper 50 for holding bulk material such as molding sand 40. The bin includes a valve 55 at the bottom thereof for periodically emptying material from the bin. The bulk material 40 is supplied to the bin 50 by means of chute 90 which includes a conveyor 85 for transporting the bulk material from a supply bin 80 to the end of the chute 90 such that it can fall into the bulk bin 50.

Figure 2:
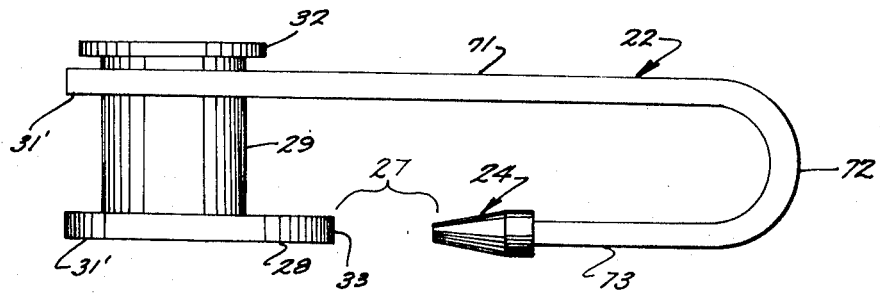
FIG. 2 is a side view of a level indicator or sensor embodying the present invention.
Figure 3:
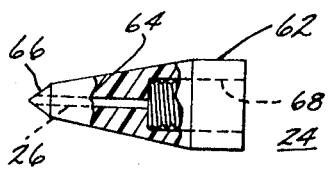
FIG. 3 is a partially cutaway side view of a nozzle associated with the level indicator of FIG. 2.
Figure 4:
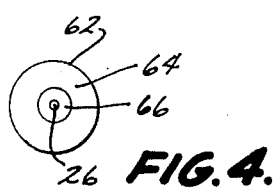
FIG. 4 is a front view of the nozzle shown in FIG. 3.

The bin 50 includes an upper sensor or indicator 10 and a lower sensor indicator 20 for detecting the level of the bulk material within the bin. The structure of the sensor 20 is shown in FIGS. 2 through 4 and includes a J-shaped output tube or pressure source 22 and a straight input tube pressure sensor 28 which are rigidly attached to a mounting plate 29 such that an air gap 27 exists between a nozzle 24 on the output tube and an open end 33 of the input tube 28. This attachment is effected, as illustrated, such that the stream of gas flowing from nozzle 24 will be directed toward and into the opening 33 in input tube 28. Pressurized air is supplied to each output tube of each level indicator or level sensor by means of supply tubes 34 and 34' which are coupled to sources of regulated compressed air 30 and 30' respectively. Other gases such as nitrogen may likewise be utilized in place of air.

Supply tube 34 is coupled to a conduit 44 (FIG. 1) by suitable coupling means 58 mounted on a mounting plate 54. As seen in FIG. 2 the output tube 22 of the lower sensor 20 has a threaded portion 31 to which the conduit 44 can be attached. A second conduit 52 is coupled to the threaded end 31' of the input tube 28 of the sensor 20 and couples the input tube to a pressure-actuated switch 25 by means of a further conduit 56 which is joined to the conduit 52 by suitable coupling means 59 mounted on bracket 54. Conduits 44 and 52 may be of a flexible nature to reduce caking of bulk material around these conduits during use, although they should be sufficiently rigid to prevent collapsing when surrounded by the material 40.

The sensor is oriented preferably in a generally vertical plane such that the air stream from the nozzle of the output tube is directed upward. This orientation prevents the bulk material from clogging the open-ended input tube when the level of the bulk material obstructs the air gap of the sensor.

Instead of mounting the level indicator with supply and return conduits which extend to the top of the bin as indicated at sensor 20 in FIG. 1, it is possible to fabricate and install the sensors as shown by the upper sensor 10 such that the output and input tubes extend directly through the walls of the bin by means of suitable couplings 58' and 59' to which the supply conduit or line 34' and line 12 can be directly connected. The line 12 couples the input tube of sensor 10 to a pressure-actuated switch 15. Pressure-actuated switches 15 and 25 are coupled to the input tube of each sensor such that as the air gap between the output tube and the input tube of the sensors are either obstructed or unobstructed, the pressure differential in lines 12 and 56 can be employed to activate an electrical switch or other suitable means to provide a control signal. The control signal can be utilized to activate a conveyor drive means 45 by means of a control circuit 35 to refill the bin when the level has fallen below the lower sensor 20. The refilling operation is accomplished by activating the conveyor drive means 45 by means of a signal from the control circuit 35. A mechanical coupling 47 such as a belt or gear drive system is employed to operate the conveyor 85 mounted in the chute 90 of storage bin 80. The conveyor 85 includes a conveyor belt 88 on which is mounted a multiplicity of bucket members 86 which scoop the bulk material from the supply bin and transport the material to the end of the chute 90 where it can drop into the bulk bin for refilling.

The details of the fabrication of the sensor 20 are shown in FIGS. 2 through 4. The output tube 22 includes an elongated portion 71, a curved portion 72, and a shank portion 73. Tube 22 can be fabricated from steel tubing or any suitable material. A nozzle 24 is attached to the shank 73 of tube 22 as shown. The nozzle can be fabricated from Teflon, Nylon, or other material to which the sand or other bulk material will not easily adhere, thereby preventing clogging of the output tube 22. The input tube 28 is rigidly fixed in position relative to the output tube by means of the mounting plate 29 to which both tubes are affixed by, for example, welding. It is necessary that the tubes be aligned such that the stream of air from the nozzle of the output strikes the open end 33 of the input tube and increases the air pressure in the input tube. The mounting plate 29 may include a flange portion 32 to facilitate the mounting of the sensor to the side walls of a storage bin.

As shown in the figures, the nozzle 24 includes a small aperture 26 through which the compressed air passes to provide the air stream which is directed through the open end 33 of the input tube 28. The nozzle 24, as shown in FIG. 3, includes a collar portion 62, a tapered portion 64 and a tip portion 66 in which an aperture 26 is formed. The nozzle also includes an aperture 68 in the end remote from the tip which may be threaded for engagement with the output tube 22 of the sensor.

In one application where the sensor was employed for detecting the level of foundry molding sand, the following dimensions were employed for the sensor: air gap 27 was 1 ¼ inches, the nozzle outlet aperture 26 was one thirty-second inches, the diameter of the output and input tubes was three-eights inch and the air pressure was from 2 to 4 psi. Although these parameters provided the desired operation for foundry molding sand, it may be necessary to modify them for other types of bulk material. The nozzle outlet, however, if too small will provide a stream of air whose velocity is excessive and will blow the bulk material away from the gap. The sensor will in such case not provide the desired indication of the presence of the bulk material since an air pocket will be formed around the gap between the output and input tubes. Likewise the air pressure associated with a given nozzle should be sufficiently low to prevent the same undesirable effect. On the other hand, if the nozzle outlet aperture 26 is too large the bulk material may tend to clog the aperture when the sensor is not in use. Thus, the outlet must be designed for the particular material being used to provide the desired air stream in conjunction with the air pressure employed.

Likewise, the air gap must be neither too small nor too large. If the gap is too small, it may prevent the bulk material from being interposed between the nozzle outlet aperture and the input tube and prevent the indication of the presence of bulk material. If the gap is too large, the effective coupling of the air stream to the open end of the input tube is diminished and the pressure differential will be substantially reduced as the bulk material intersects the air stream. The particular air gap used as well as the air pressure employed will depend partly upon the type of pressure-actuated switch utilized in a given application. In one embodiment, a switch such as shown in FIG. 5 was successfully employed.

Figure 5:
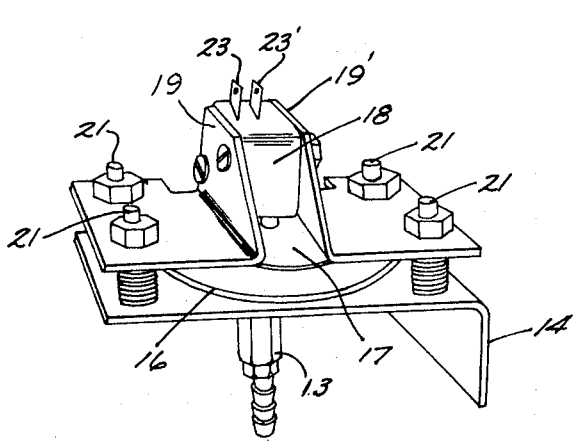
FIG. 5 is an elevational perspective of a pressure-actuated switch which can be employed in the control system of the present invention.

FIG. 5 illustrates a pneumatically-operated electrical switch which comprises a mounting plate 14 on which is mounted an air inlet coupling 13 communicating with the interior of a bellows or flexible diaphragm 16. Diaphragm 16 has a backing plate 17 which contacts an electrical switch 18. The switch 18 is mounted to mounting bracket 19 — 19' and the combination is mounted rigidly with respect to bracket 14 by mounting bolts 21 as shown in the figure.

The switch operates on the differential pressure applied to the inlet 13 from the input tube of a sensor as bulk material is absent or present in the gap of the sensor. The pressure change will extend the bellows and trip switch 18, or contract the bellows and open switch 18. The electrical terminals 23 — 23' of switch 18 will thereby provide a conductive path when, for example, the bulk material is not obstructing the sensor gap and the bellows are extended to trip the switch. One such switch assembly which is commercially available and which was successfully employed is manufactured by Gagne Associates, Inc., Model SF3 – 2".

Figure 6:
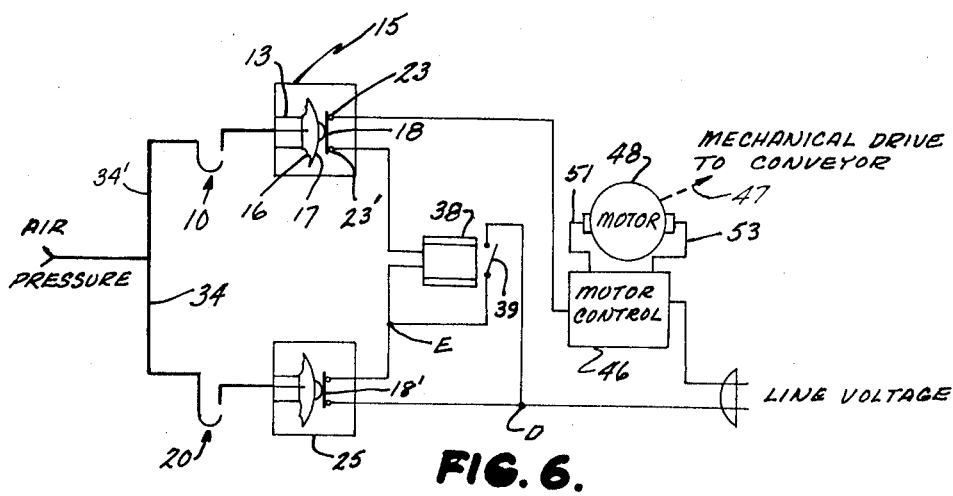
FIG. 6 is a schematic diagram showing pneumatic and electrical systems suitable for controlling the level of the bulk material in the bulk bin of FIG. 1.

FIG. 6 illustrates a system including the control means for actuating the conveyor drive means 45 which includes a motor control means 46 as shown in the figure. Components in FIG. 6 which are identical to those in FIGS. 1 and 5 are labeled with the same reference characters. The heavy lines indicate the pneumatic circuit while the lighter lines show the electrical circuitry. The pressure-actuated switches 15 and 25 are shown in the closed positions which occur when the bulk material is below the lower sensor 20 as, for example, at the level A shown in FIG. 1. The motor control means 46 is coupled to one side of an electrical supply line while the other terminal of the motor control 46 is coupled to the opposite side of the line by means of the closed switch 18, a relay coil 38, and a closed switch 18' associated with the pressure-actuated switch 25. Referring to FIGS. 1 and 6, a cycle of operation will be described in which the bulk bin can automatically be filled when the level falls below a predetermined lower level limit.

OPERATION

Given the initial conditions that the bin 50 of FIG. 1 is at level A, both gaps of the sensors 10 and 20 will be unobstructed by bulk material, thereby allowing the air streams from their respective nozzles to provide sufficient pressure to the switches 15 and 25 such that the bellows and backing plates will be extended to close the switches 18 and 18' as shown in FIG. 6.

When the switch 18' is closed, the voltage at terminal D will be applied to terminal E of relay 38. The other terminal of the relay is coupled to the opposite side of the line by means of the closed contact of switch 18 and the motor control 46. Thus, a completed electrical circuit exists for current to flow through the motor control by means of the closed switches and the relay coil. The motor control circuit 46 (included in block 35 of FIG. 1) will supply electrical current by means of conductors 51, 53 to activate an associated motor 48.

The motion of the motor armature is coupled to the conveyor 85 by means of a suitable mechanical coupling 47 such that the conveyor will begin transporting the bulk material from the supply bin 80 to the bulk bin 50. As the level of bulk bin 50 reaches the point A, the air gap associated with the sensor 20 will become obstructed such that the pressure on the bellows will decrease and the switch 18' will open. The current path through the motor, however, will be completed by means of the latching relay 38. This results, since, when the power is first applied to terminal E by means of switch 18', the relay coil operates to close switch contact 39 associated with the relay and latches this relay into its on position. This latching action allows the motor to continue operating and filling the bin after the bulk level has risen above sensor 20. As the bulk level rises above sensor 10 (i.e. near level B), the gap associated with sensor 10 is obstructed and the switch 18 is opened since the pressure is reduced on the bellows 16 and it contracts to release the switch. As this occurs, the formerly completed current path through the motor is interrupted, the motor will become inactivated, and the conveyor will cease supplying bulk material from the supply bin to the bulk bin 50.

As the bulk material is depleted when valve 55 is opened, upper sensor 10 will again have an unobstructed air gap and switch 18 will be closed. The motor will not be activated, however, since the relay 38 is not latched on and the lower level sensor 20 has not detected the absence of bulk material and switch 18' remains open thereby blocking current from flowing through the motor 46. As the bulk material again decreases to a level below the lower sensor 20, however, the switch 18' will be activated by the increased air pressure against the pressure-actuated switch 25 and the cycle will be repeated.

Although the embodiment shown employs two separate sensors and a control circuit as shown in FIG. 6, it may be necessary only to employ a single sensor which could be mounted at any location on the bulk bin which is desired to give the user an indication of bulk material at that level. Likewise, a variety of control systems can be employed to operate the automatic loading feature by using the level sensors of the present invention and suitable control means. Additionally, the pressure-actuated switches need not be pneumatic-electric type switches but could rather be pneumatically-operated pneumatic switches which convert the pressure differential into further pressure changes which actuate the conveyor drive means in a desired manner. Finally, although it is necessary to orient the sensors in a generally vertical plane as shown in FIG. 1, it is not necessary to mount them on the same wall or in any particular relationship with respect to one another. The particular application may dictate that the lower sensor, for example, be mounted on the tapered portion of the bottom portion of the bulk bin 50 and that the upper sensor be mounted midway the vertical portion of the bin 50. This may be required due to the time lag between the sensing of material and the actual ceasing of the filling operation from the chute 90 due to the sand or other bulk material on the conveyor 85 or in the chute 90 at the time the upper sensor detects the presence of bulk material.

The embodiments of the invention in which an exclusive property or privilege is claimed are defined as follows:

1. A level sensor for detecting the presence of bulk material in a container, said sensor comprising: means positioned within said container for generating a stream of gas, receiving means having an open end for receiving therewithin at least a portion of said stream of gas, means positioning said receiving means spaced from said generating means to provide a predetermined gap therebetween and aligned therewith to directly receive at least a portion of said stream of gas whereby said receiving means has a first pressure therein when said gap is unobstructed by bulk material and different pressure therein when said gap is obstructed by bulk material, and means for sensing the pressure in said receiving means and for providing a signal indicative of the presence or absence of bulk material in said gap between said generating means and said receiving means.

2. A sensor as defined in claim 1 wherein said generating means includes an open tube having a nozzle attached to one end thereof and means for coupling the other end to a source of pressurized gas.

3. A sensor as defined in claim 2 wherein said receiving means comprises an open tube having one open end rigidly positioned to intercept at least a portion of said stream of gas, and the other end adapted to be coupled to said sensing means.

4. A sensor as defined in claim 3 wherein said tube included in said generating means comprises a J-shaped tube having an elongated portion, a curved portion and shank portion, and wherein said nozzle is attached to said shank portion.

5. A sensor as defined in claim 4 and further comprising: mounting means for rigidly mounting said tube included in said generating means in fixed relationship to said tube included in said receiving means.

6. A sensor as defined in claim 5 wherein said sensing means comprises a pressure-actuated switching means.

7. A sensor as defined in claim 6 wherein said switching means includes an electrical switch for opening and closing contacts associated with said switch in response to pressure changes in said receiving means due to bulk material being present or absent in said gap between said nozzle and said receiving means.

8. A pneumatically-operated sensor adapted to be mounted within a container for detecting the presence of bulk material in said container, said sensor comprising: first means having a nozzle thereon, said first means including means for applying pressurized gas to said nozzle such that a stream of gas exits said nozzle; second means having a generally hollow body and including an opening therein, and; third means for rigidly positioning said second means in relation to said first means such that gas from said nozzle is directed into said opening of said second means, and such that a gap of predetermined width exists between said nozzle of said first means and said opening of said second means, whereby a pressure differential will occur within said second means when bulk material obstructs said gap.

9. For use as a bulk bin level indicator, a pneumatically-operated sensor comprising: a first J-shaped tube having an elongated portion, a curved portion, and a shank portion; a nozzle attached to an open end of said end portion of said first tube; a second tube having an open end; and means for rigidly affixing said second tube to said elongated portion of said first tube in a position whereby said open end of said second tube is in approximate alignment with said nozzle attached to said first tube and whereby a gap exists between said open end of said second tube and said nozzle attached to said first tube.

10. A sensor as defined in claim 6 wherein said first tube includes means for coupling a source of pressurized air to an end of said first tube remote from said nozzle.

11. A sensor as defined in claim 7 wherein said second tube includes means for coupling an end of said second tube remote from said open end to a pressure-operated control device.

12. A sensor as defined in claim 8 wherein said nozzle has an aperture therethrough which supplies a stream of air when said first tube is coupled to said source of pressurized air, and wherein said stream of air is directed into said open end of said second tube.

13. A sensor as defined in claim 9 wherein said gap formed by the space between said nozzle and said open end of said second tube is sufficiently wide to allow bulk material stored in said bin to obstruct the air stream from said nozzle when the bulk material is at the level at which said sensor is installed in said bin.

14. A sensor as defined in claim 10 which further includes means coupled to said sensor for attaching said sensor to said bin.

15. A bulk bin level indicating and control system for automatically refilling a bulk bin when the bulk material stored therein reaches a predetermined level, said system comprising: at least one pneumatically operated sensor comprising a first tube having a nozzle at one end thereof and being coupled to a source of pressurized air for providing a stream of air from said nozzle, and a second tube mounted in fixed relationship to said first tube such that said stream of air is directed into an open end of said second tube and whereby a gap exists between said open end of said second tube and said nozzle of said first tube such that said bulk material will obstruct said gap when the bulk material is at the level of said sensor; means coupled to said second tube at an end remote from said open end for detecting the resulting pressure change when said air stream from said nozzle is interrupted by said bulk material and for providing a control signal indicative of the presence or absence of bulk material at said level of said sensor; means for supplying bulk material to said bin and means for actuating said supplying means, said actuating means being coupled to said providing means and responsive to a control signal therefrom to actuate said supplying means.

16. A system as defined in claim 15 wherein a lower level sensor is employed to detect the presence of bulk material at a first predetermined level in said bin and in conjunction with an associated control means coupled thereto, activate said supplying means such that bulk material is added to said bin when no bulk material is detected by said lower level sensor.

17. A system as defined in claim 16 wherein an upper level sensor is further provided within said bin to detect the presence of bulk material at a second predetermined level in said bin, and in conjunction with an associated control means coupled thereto, inactivate said supplying means when the level of bulk material reaches said second predetermined level.

* * * * *